US009386618B2

(12) United States Patent  (10) Patent No.: US 9,386,618 B2
Al-Shalash  (45) Date of Patent: Jul. 5, 2016

(54) SYSTEM AND METHOD TO SUPPORT MULTIPLE RADIO ACCESS TECHNOLOGY RELAYS WITH A UNIFIED BACKHAUL TRANSPORT NETWORK

(71) Applicant: FutureWei Technologies, Inc., Plano, TX (US)

(72) Inventor: Mazin Al-Shalash, Frisco, TX (US)

(73) Assignee: Futurewei Technologies, Inc., Plano, TX (US)

( * ) Notice: Subject to any disclaimer, the term of this patent is extended or adjusted under 35 U.S.C. 154(b) by 299 days.

(21) Appl. No.: 13/959,385

(22) Filed: Aug. 5, 2013

(65) Prior Publication Data

US 2014/0036762 A1  Feb. 6, 2014

Related U.S. Application Data

(60) Provisional application No. 61/679,648, filed on Aug. 3, 2012.

(51) Int. Cl.
 *H04W 76/02* (2009.01)
 *H04W 84/04* (2009.01)
 *H04W 88/06* (2009.01)
 *H04W 88/10* (2009.01)

(52) U.S. Cl.
 CPC .......... *H04W 76/025* (2013.01); *H04W 76/022* (2013.01); *H04W 84/047* (2013.01); *H04W 88/06* (2013.01); *H04W 88/10* (2013.01)

(58) Field of Classification Search
 CPC ................................................... H04W 76/025
 See application file for complete search history.

(56) References Cited

U.S. PATENT DOCUMENTS

| 2008/0227468 | A1* | 9/2008 | Niska et al. ................. 455/456.2 |
| 2009/0170472 | A1 | 7/2009 | Chapin et al. |
| 2010/0142483 | A1 | 6/2010 | Wu et al. |
| 2010/0279682 | A1* | 11/2010 | Rangaiah et al. .......... 455/426.1 |
| 2011/0294534 | A1* | 12/2011 | Gunder ......................... 455/524 |
| 2012/0039240 | A1* | 2/2012 | Han et al. ....................... 370/315 |
| 2012/0142341 | A1* | 6/2012 | Nagpal et al. .............. 455/426.1 |

(Continued)

OTHER PUBLICATIONS

Huawei, "Architectural Solutions for Multi-RAT Support with Mobile Relays," R3-121657, 3GPP TSG RAM WG3 Meeting #77, Aug. 13-17, 2012, Qingdao, P.R. China, pp. 1-8.
New Postcom,"Discussion and Comparison on Multi-RAT Support for Mobile Relay," 3GPP TSG RAN WG3 Meeting #76, R3-121119, Prague, Czech Republic, May 21-25, 2012, 3 pages.

(Continued)

*Primary Examiner* — Brian D Nguyen
*Assistant Examiner* — Toan Nguyen
(74) *Attorney, Agent, or Firm* — Slater Matsil, LLP (57) ABSTRACT

Embodiments are provided for supporting multiple Radio Access Technologies (RATs) using a common backhaul transport network. A relay node is configured to instantiate a virtual-user equipment (V-UE) layer for a UE, upon determining that the UE uses a different RAT than the backhaul transport network. A connection is then established between the V-UE layer and a V-UE gateway using a pre-existing radio interface between the relay node and a base station. Upon receiving data from the UE, the relay node translates the data into a RAT format supported by the backhaul transport network, and sends the data on the connection via the base station, wherein the RAT format of the UE is transparent to the base station. A generic access network controller is also configured to connect and exchange signaling with the relay node to establish a service for the UE and configure radio resource on the relay node.

35 Claims, 7 Drawing Sheets

(56) References Cited

U.S. PATENT DOCUMENTS

2013/0029639 A1* 1/2013 Lee ................... H04W 92/02
 455/411
2013/0089022 A1* 4/2013 Lu et al. .................. 370/315

OTHER PUBLICATIONS

Notification of Transmittal of the International Search Report and the Written Opinion of the International Searching Authority or the Declaration received in Application No. PCT/US13/53646, mailed Oct. 18, 2013, 12 pages.

* cited by examiner

SYSTEM AND METHOD TO SUPPORT MULTIPLE RADIO ACCESS TECHNOLOGY RELAYS WITH A UNIFIED BACKHAUL TRANSPORT NETWORK

This application claims the benefit of U.S. Provisional Application No. 61/679,648 filed on Aug. 3, 2012 by Mazin Al-Shalash and entitled "Method and Apparatus to Support Multiple Radio Access Technology Relays with a Unified Backhaul Transport Network," which is hereby incorporated herein by reference as if reproduced in its entirety.

TECHNICAL FIELD

The present invention relates to the field of network communications, and, in particular embodiments, to a system and method to support multiple radio access technology relays with a unified backhaul transport network.

BACKGROUND

Different Radio Access Technologies (RATs), such as GERAN, UTRAN, Long Term Evolution (LTE), 1xRTT, WiMAX, and WiFi employ corresponding core networks. Mobile operators typically need to support multiple RATs for legacy wireless technologies, or due to mergers of different operators with different RAT deployments. Operators can achieve large capital and operation cost (CAPEX and OPEX) savings by deploying base station equipment supporting multiple RATs (referred to as single radio access network (RAN) solution). However, operators still need to deploy separate core networks to support the different RATs. In case of multi-RAT deployment, interoperability between different RATs needs to be guaranteed, which adds additional complexity and equipment to be deployed and maintained, and further needs new inter-working interfaces to be validated. There is a need for an improved multi-RAT architecture that enables operators to unify and simplify their core network deployments, e.g., to save cost, support legacy technologies, and further integrate new technologies.

SUMMARY OF THE INVENTION

In accordance with an embodiment, a method for supporting multiple Radio Access Technologies (RATs) using a common backhaul transport network includes detecting, at a relay node, an access request from a user equipment (UE) using a different RAT than the backhaul transport network. The method further includes, upon determining that the UE is using a different RAT than the backhaul transport network, instantiating, at the relay node, a virtual-UE (V-UE) layer, and establishing a connection between the V-UE layer and a V-UE gateway and a default bearer to the V-UE gateway via a pre-existing radio interface between the relay node and a base station of the backhaul transport network.

In accordance with another embodiment, a relay node configured for supporting multiple RATs using a common backhaul transport network includes at least one processor and a computer readable storage medium storing programming for execution by the at least one processor. The programming includes instructions to detect an access request from a UE using a different RAT than the backhaul transport network. Upon determining that the UE is using a different RAT than the backhaul transport network, the relay node instantiates a V-UE layer, and establishes a connection between the V-UE layer and a V-UE gateway and a default bearer to the V-UE gateway via a pre-existing radio interface between the relay node and a base station of the backhaul transport network.

In accordance with another embodiment, a method for supporting multiple RATs using a common backhaul transport network includes establishing, at a gateway, a connection with a V-UE layer at a relay node and a default bearer to the relay node. The connection is established via a pre-existing radio interface between the relay node and a base station of the backhaul transport network. The V-UE layer at the relay node is instantiated to serve an access request to the relay node from a UE using a different RAT than the backhaul transport network.

In accordance with another embodiment, a network gateway configured for supporting multiple RATs using a common backhaul transport network includes at least one processor and a computer readable storage medium storing programming for execution by the at least one processor. The programming includes instructions to establish a connection with a V-UE layer at a relay node and a default bearer to the relay node. The connection is established via a pre-existing radio interface between the relay node and a base station of the backhaul transport network. The V-UE layer at the relay node is instantiated to serve an access request to the relay node from a UE using a different RAT than the backhaul transport network.

In accordance with another embodiment, a method for supporting multiple RATs using a common backhaul transport network includes establishing, at a Generic Access Network Controller (GANC), a connection to a relay node via a default bearer between the relay node and a V-UE gateway. The default bearer is established via a pre-existing radio interface between the relay node and a base station of the backhaul transport network. The method further includes receiving, from the relay node, a request to a service for the UE, and exchanging signaling with the relay node to establish the service and configure radio resource on the relay node.

In accordance with yet another embodiment, a network component configured for supporting for providing multiple RATs using a common backhaul transport network includes at least one processor and a computer readable storage medium storing programming for execution by the at least one processor. The programming includes instructions to establish a connection to a relay node via a default bearer between the relay node and a V-UE gateway. The default bearer is established via a pre-existing radio interface between the relay node and a base station of the backhaul transport network. The network component is further configured to receive, from the relay node, a request to a service for the UE, and exchange signaling with the relay node to establish the service and configure radio resource on the relay node.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention and leverage a common core network (e.g., a LTE enhanced packet Core) for the different RATs.

Embodiments are provided herein to enable a multi-RAT architecture and operation with a unified or common backhaul transport network. The architecture leverages a common RN for serving the different RATs. The RN may communicate with user equipments (UEs) using different RATs and is connected, via a backhaul link, to a base station (or eNB) referred to herein as a donor eNB (DeNB). The DeNB and the backhaul link form a unified backhaul transport network for the multi-RAT RN. The DeNB uses a RAT of choice, such LTE/LTE advanced, to support the backhaul transport network from the RN. Further, for each RAT supported by the RN, a corresponding CN may be connected to the RN via the backhaul transport network. The details of the UE's RAT and its CN are hidden from the unified backhaul transport network, through the mechanism of instantiates a virtual UE (V-UE) by the RN for each real UE it serves on a RAT different than that of the unified backhaul transport. From the perspective of the unified backhaul transport network, it is serving the virtual UE, which appears to be using the same RAT as all other UEs served by this network (e.g. LTE/LTE advanced). Once a V-UE is instantiated by the RN, it attaches and connects to a common core network appropriate for the RAT of the V-UE, e.g., a V-UE instantiated for LTE/LTE advanced, would attach and connect to an LTE evolved packet core (EPC). Additionally, a Generic Access Network Controller (GANC) is positioned between the core network of the V-UEs (V-UE CN) and the multiple CNs for the different RATs supporting the real UEs served by the RN. Suitable packet data bearers are setup between the GANC and each V-UE in the RN, via the backhaul transport network providing the connection from V-UE's CN to the V-UE in the RN. These packet data bearers carry control plane and user plane data for the real UEs served by the RN between the GANC and each V-UE. The GANC is configured to receive the data or packets of the different RATs from the RN, via the backhaul transport network, and process or translate the packets (e.g., via protocol mapping or encapsulation/decapsulation) before forwarding the packets to the corresponding CNs of the real UE. The quality of service requirements (QoS) of each packet data bearer is selected by the GANC, such as to satisfy the QoS requirements of the corresponding data and signaling flows of each different RAT. Other than meeting the corresponding QoS requirements for each data or control flow, the unified backhaul transport network has additional knowledge of the configuration or content of the data or packets transported for each different RAT.

In the provided multi-RAT relay architecture, the RN, GANC, and V-UE components are configured to enable a typical or available DeNB, as part of a backhaul transport network, to handle multiple RATs without adding additional functionality to and avoiding extra operation burden on the DeNB. Further, no additional components or functionality is needed at the CNs to support these different RATs. The DeNB may proxy, tunnel, or otherwise transport the data for the various CNs to the RN in a typical manner, where RATs that are not supported by the DeNB are transparent to the DeNB.

Figure 1:
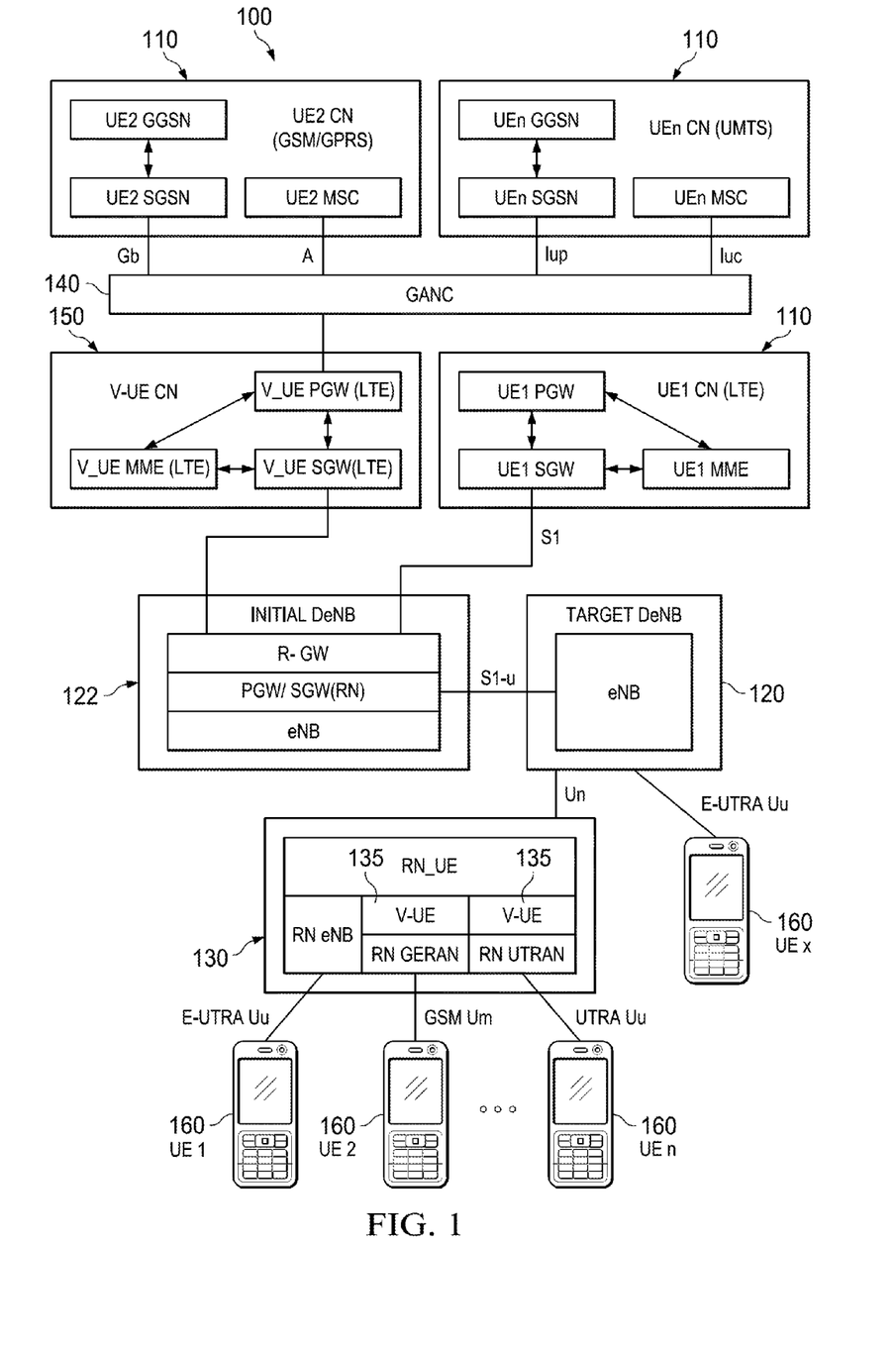
FIG. 1 illustrates an embodiment architecture for a multi-RAT relay with a unified backhaul transport network.

FIG. 1 shows an embodiment architecture 100 for a multi-RAT relay with a unified backhaul transport network. The architecture 100 serves a plurality of UEs 160 (UE1, UE2 . . . UEn, where n is an integer) configured to operate based on different RATs. As such, the architecture 100 includes a plurality of corresponding CNs 110 based on the different RATs, e.g., UE1 CN based on LTE, UE2 CN based on GSM . . . UEn CN based on UMTS. The architecture also includes at least one DeNB 120 that may be part of a backhaul transport network. The DeNB 120 may be a target DeNB for a multi-RAT RN 130 that allows the UEs 160 access to the corresponding CNs 110. Furthermore, the DeNB 120 may serve other UEs independently of the RN, and the RAT served by the DeNB may or may not correspond to one of the RATs served by the RN 130. For instance, UEx 170 may be an LTE UE served by the same LTE CN, or a different LTE CN, that serves UE1. The RN 130 may be a fixed or a mobile RN, such as in a moving vehicle, train, or airplane. In the case of a mobile RN 130, the RN 130 may be on the move and perform a handover between an initial DeNB 122 and a target DeNB 120.

To hide the details of the access technology (RAT) used by the UEs 160 from the backhaul transport network (e.g., the DeNB 120/DeNB 122 for LTE), an adaptation layer is introduced at the multi-RAT RN 130. When a UE 160 accesses the RN using a RAT other than the backhaul RAT, the adaptation layer at the RN instantiates a virtual UE that supports the UE's RAT. For instance, in case of a LTE backhaul transport network, to serve UE2 using GSM or UEn using UTRA or UMTS, a virtual LTE UE (V-UE) layer 135 is instantiated at the RN 130. The V-UE 135 attaches to the LTE network via the DeNB 120 using standard LTE procedures, as if the V-UE layer 135 at the RN 130 were an actual LTE UE served by the RN 130. The backhaul transport network (e.g., LTE EPC) selects a packet data network gateway (PGW), located in CN 150 (V-UE CN), to serve the V-UE layer 135. The V-UE CN 150 may comprise a PGW and a one or more SGW components for transporting user plane data to the V-UEs, and one or more mobility management entities (MMEs) to manage signaling for the V-UEs. The PGW in V-UE CN 150, in turn, assigns the virtual UE an Internet Protocol (IP) address. A default bearer is then set up to tunnel IP packets to the V-UE layer 135 through the PGW and a Serving Gateway (SGW), to the initial DeNB 122. The default bearer is tunneled to the RN 130 from the RN PGW/SGW functionality in the initial DeNB 122, to the target DeNB 120, and finally to the RN 130. With the configuration of the default bearer, the LTE network (being the backhaul transport network in this case) provides a generic IP network to transport data to the V-UE layer 135 at the RN 130.

The architecture 100 also includes a GANC 140 and a V-UE CN 150, e.g., a V-UE PGW/SGW and V-UE MME. The GANC 140 provides an access point for the V-UE CN 150 to obtain services from any other network with a different RAT than that of the backhaul transport network of the DeNB 120, for example 2$^{nd}$ Generation (2G) GSM/GPRS, 3$^{rd}$ Generation (3G) UMTS/HSPA, or non-3GPP compatible CNs, such as WiFi, WiMAX, CDMA or HRPD. Service requests from the real UE 110 may trigger the adaptation layer (V-UE layer 135) at the RN 130 to request the setup or modification of additional bearers supported by the backhaul transport network (e.g., LTE bearers in the example above) towards the V-UE CN 150. These bearers may be configured to provide appropriate Quality of Service (QoS) for the tunneled 2G, 3G or non-3GPP bearers. The V-UE CN 150 connects to RN 130 through other nodes of the backhaul transport network (e.g., via the initial LTE DeNB 122 if present and the target LTE DeNB 120) using standardized LTE interfaces (e.g., a S1-u for user plane data, and S1-MME for control plane information). The V-UE CN 150 also connects to the GANC 140 using a standardized interface, (e.g., a standard IP connection). In addition, the GANC connects to the RN using an interface defined for Generic Access Network (GAN). The GANC 140 may be a stand-alone node or may be integrated into other network nodes of the network, (e.g., a PGW for the V-UE CN 150).

The GANC 140 may appear as a RAN, e.g., a radio network controller (RNC) or basic station controller (BSC), to the UE's 160 corresponding CNs 110 (e.g., non-LTE CNs 110 in this example). The GANC 140 interfaces and delivers to the V-UE layer 135 both user plane data and control signaling over the GAN Up interface, for example via a Generic Access Radio Resource Control (GA-RRC) layer. The backhaul transport network (e.g., LTE EPC) and the GANC 140 (acting as a RAN) provide a transport path for the data packets of the CN 110 to the multi-RAT RN 130. The Up interface terminates at the V-UE layer 135 in the multi-RAN RN 130. The RN 130, in turn, translates the GA-RRC control messages into control messages appropriate to the corresponding RAN technology (e.g., GERAN or UTRAN) of the served UE 160. The multi-RAT RN 130 then delivers these control messages to the real UE 160 over the appropriate RAT air interface. In the architecture 100, a 2G or 3G RN 130 may appear as a Base Transceiver Station (BTS) or node-B (NB), respectively, to the GANC 140. Regarding the UE 160 communicating based on the RAT of the backhaul transport network (e.g., LTE UE1), the initial DeNB 122 if present and the target DeNB 120 operates in a standard manner to forward the traffic between the UE 160 and its CN 110 (UE1 LTE CN).

Figure 2:
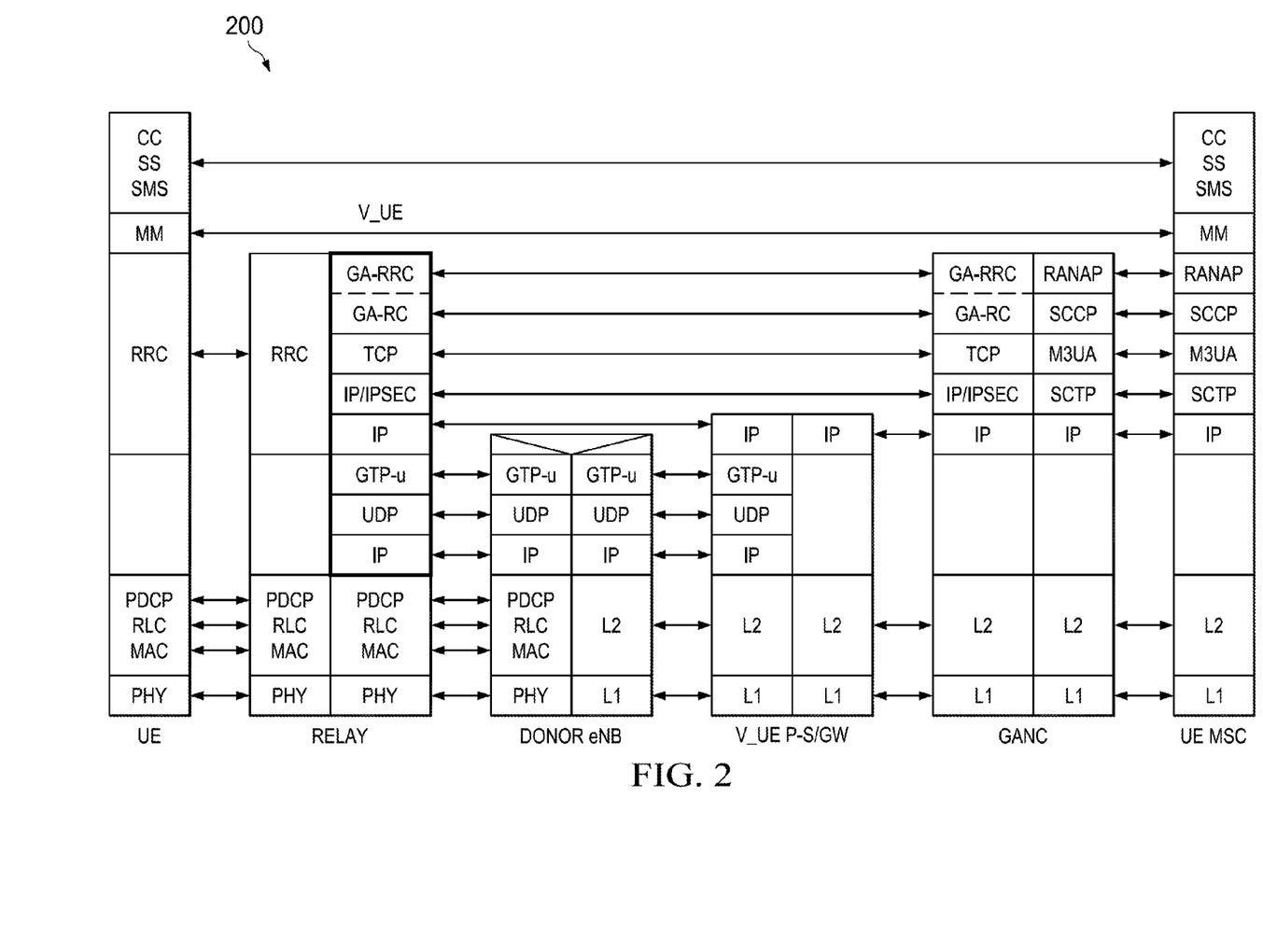
FIG. 2 illustrates an embodiment of a UTRAN circuit switched (CS) domain control plane protocol stack for multi-RAT relay with an Iu-c core network interface.

FIG. 2 shows an embodiment of a control plane protocol stack 200 for multi-RAT relay for a circuit switched (CS) domain communication. The control plane protocol stack 200 can be implemented between the different components of the architecture 100. As an example, the protocol stack 200 supports a UE access to a UE Mobile Switching Center (MSC) at the UE's CN using a different RAT e.g. GERAN or UTRAN, than the backhaul transport network, e.g., a LTE EPC. For example, the UE's CN may be a GSM or UMTS CN. The different components (UE, RN, DeNB, V-UE CN, GANC, and UE MSC) implement the lower layers of the protocol stack 200 (e.g., L1, L2, and IP layers). However, higher layers of the control plane protocol stack 200 may be transparent to the DeNB and the V-UE PGW/SGW, and handled between the RN and the GANC. As such, the DeNB and V-UE PGW/SGW tunnel the IP packets (e.g., without further processing or encapsulation) between the multi-RAT RN and the GANC. At the user end, the multi-RAT RN handles the higher layer RRC signaling from the UE. This is accomplished by instantiating a V-UE layer at the RN (as described above). The V-UE layer interfaces using GA-RRC and other higher layer protocols (e.g., GA-RC, TCP, IPSEC) with the GANC to tunnel the RRC signaling of the UE through the DeNB and the V-UE PGW/SW. At the UE's CN end, the GANC converts the control layers from the V-UE layer into the proper control protocol layers supported by the RAT of the corresponding CN (at the MSC), for example into UMTS control protocol layers (e.g., RANAP, SCCP, M3UA, SCTP). The tunneling applies in both directions between the UE and its MSC or CN. As such, services such as SMS, SS and CC may be tunneled by the V-UE (or RN) and the GANC between the real UE and the corresponding CN.

Figure 3:
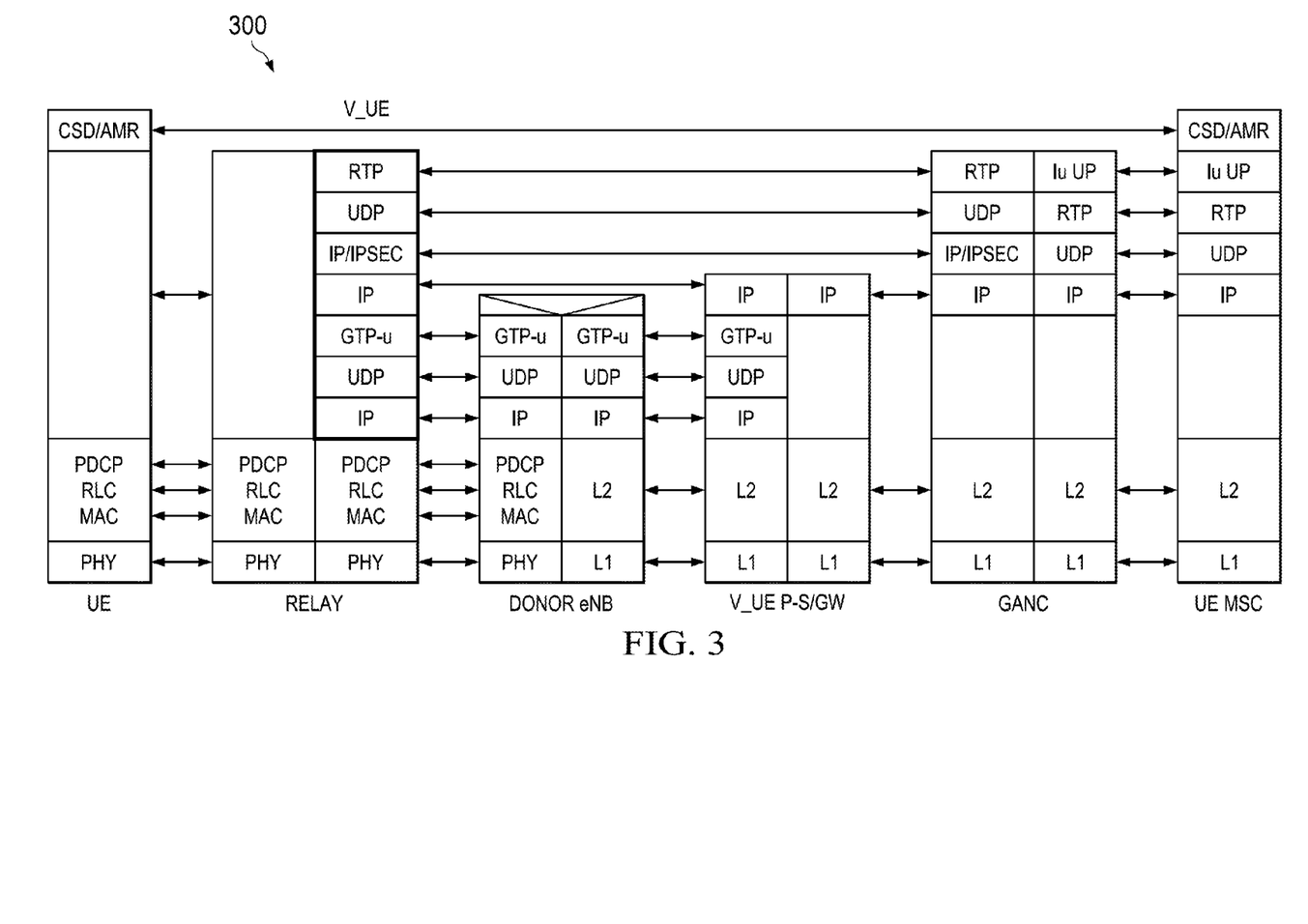
FIG. 3 illustrates an embodiment of a UTRAN CS domain user plane protocol stack for multi-RAT relay.

FIG. 3 shows an embodiment of a user or data plane protocol stack 300 for multi-RAT relay for a CS domain communication. The user plane protocol stack 300 can be implemented between the different components of the architecture 100. As an example, the protocol stack 300 supports a UE access to a UE MSC using a different RAT, e.g. GERAN or UTRAN, than the backhaul transport network, e.g., a LTE EPC. The different components (UE, RN, DeNB, V-UE CN, GANC, and UE MSC) implement the lower layers of the protocol stack 300 (e.g., L1, L2, and IP layers). However, higher layers of the user plane protocol stack 300 may be transparent to the DeNB and the V-UE PGW/SGW, and handled between the RN and the GANC. As such, the DeNB and V-UE PGW/SGW tunnel the IP packets (e.g., without further processing or encapsulation) between the multi-RAT RN and the GANC. At the user end, the multi-RAT RN handles the higher layer data packets from the UE. This is accomplished by instantiating a V-UE layer at the RN (as described above). The V-UE layer interfaces using Real-time Transport Protocol (RTP) and other higher layer protocols (e.g., UDP, IPSEC) with the GANC to tunnel the user plane data packets of the UE through the DeNB and the V-UE PGW/SW. At the UE's CN end, the GANC converts and encapsulates the user data packets from the V-UE layer into the proper data protocol layers supported by the CS domain of the corresponding CN, for example into GSM or UMTS data protocol layers (e.g., Iu UP, RTP, UDP). The tunneling applies in both directions between the UE and its CN. User/machine data, such as Circuit Switched Data (CSD)/encoded audio such as adaptive multi-rate (AMR) vocoder packets, may be tunneled by the V-UE (or RN) and the GANC between the real UE and the corresponding CN.

Figure 4:
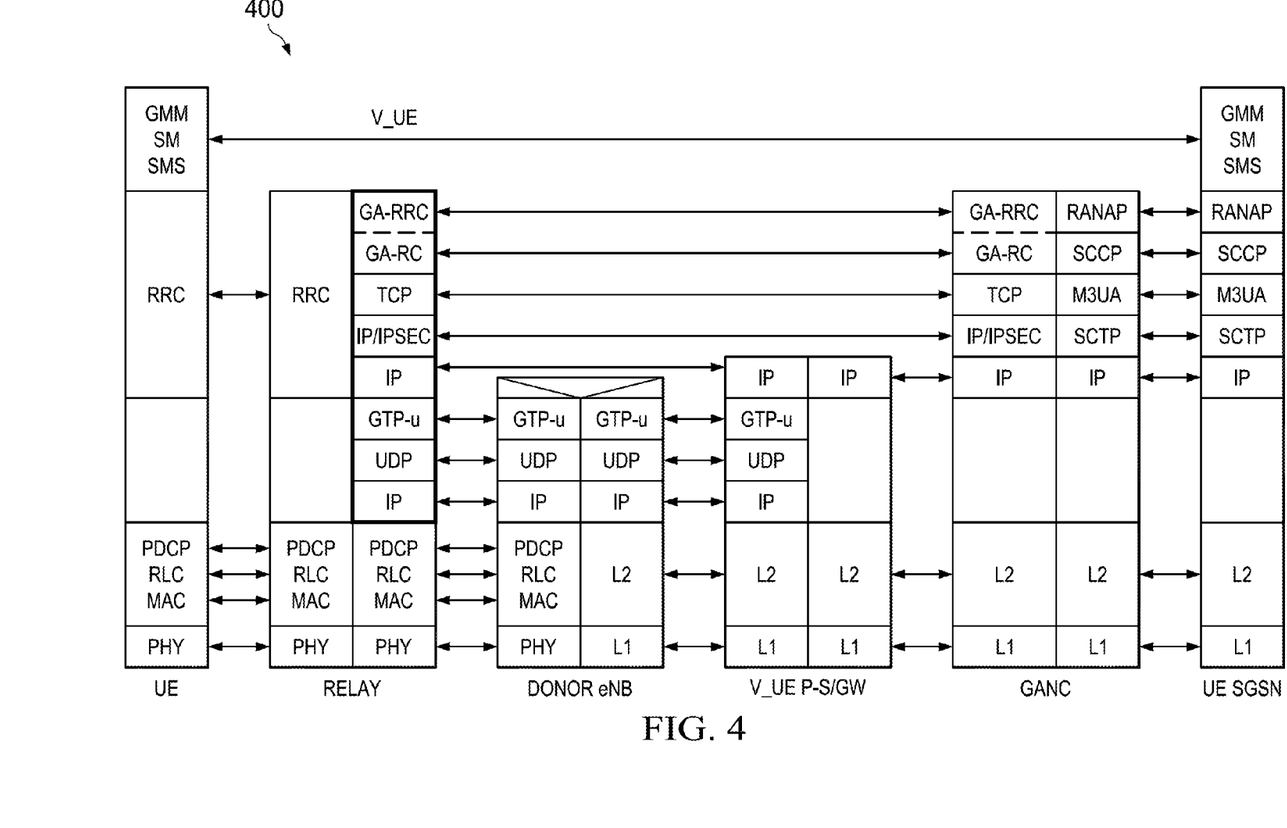
FIG. 4 illustrates an embodiment of a UTRAN packet switched (PS) domain control plane protocol stack for multi-RAT relay with an Iu-p core network interface.

FIG. 4 shows an embodiment of a control plane protocol stack 400 for multi-RAT relay for a packet switched (PS) domain communication. The control plane protocol stack 400 can be implemented between the different components of the architecture 100. As an example, the protocol stack 400 supports a UE access to a UE SGSN at the UE's CN using a different RAT than the backhaul transport network, e.g., a LTE EPC. For example, the UE's CN may be a GERAN or UTRAN CN. The different components (UE, RN, DeNB, V-UE CN, GANC, and UE MSC) implement the lower layers of the protocol stack 400 (e.g., L1, L2, and IP layers). However, higher layers of the control plane protocol stack 400 may be transparent to the DeNB and the V-UE PGW/SGW, and handled between the RN and the GANC. As such, the DeNB and V-UE PGW/SGW tunnel the IP packets (e.g., without further processing or encapsulation) between the multi-RAT RN and the GANC. At the user end, the multi-RAT RN handles the higher layer RRC signaling from the UE. This is accomplished by instantiating a V-UE layer at the RN (as described above). The V-UE layer interfaces using GA-RRC and other higher layer protocols (e.g., GA-RC, TCP, IPSEC) with the GANC to tunnel the RRC signaling of the UE through the DeNB and the V-UE PGW/SW. At the UE's CN end, the GANC converts the control layers from the V-UE layer into the proper control protocol layers supported by the RAT of the corresponding CN (at the SGSN), for example into GPRS or UMTS control protocol layers (e.g., RANAP, SCCP, M3UA, SCTP). The tunneling applies in both directions between the UE and its MSC or CN. As such, services such as SMS, SM and GMM may be tunneled by the V-UE (or RN) and the GANC between the real UE and the corresponding CN.

Figure 5:
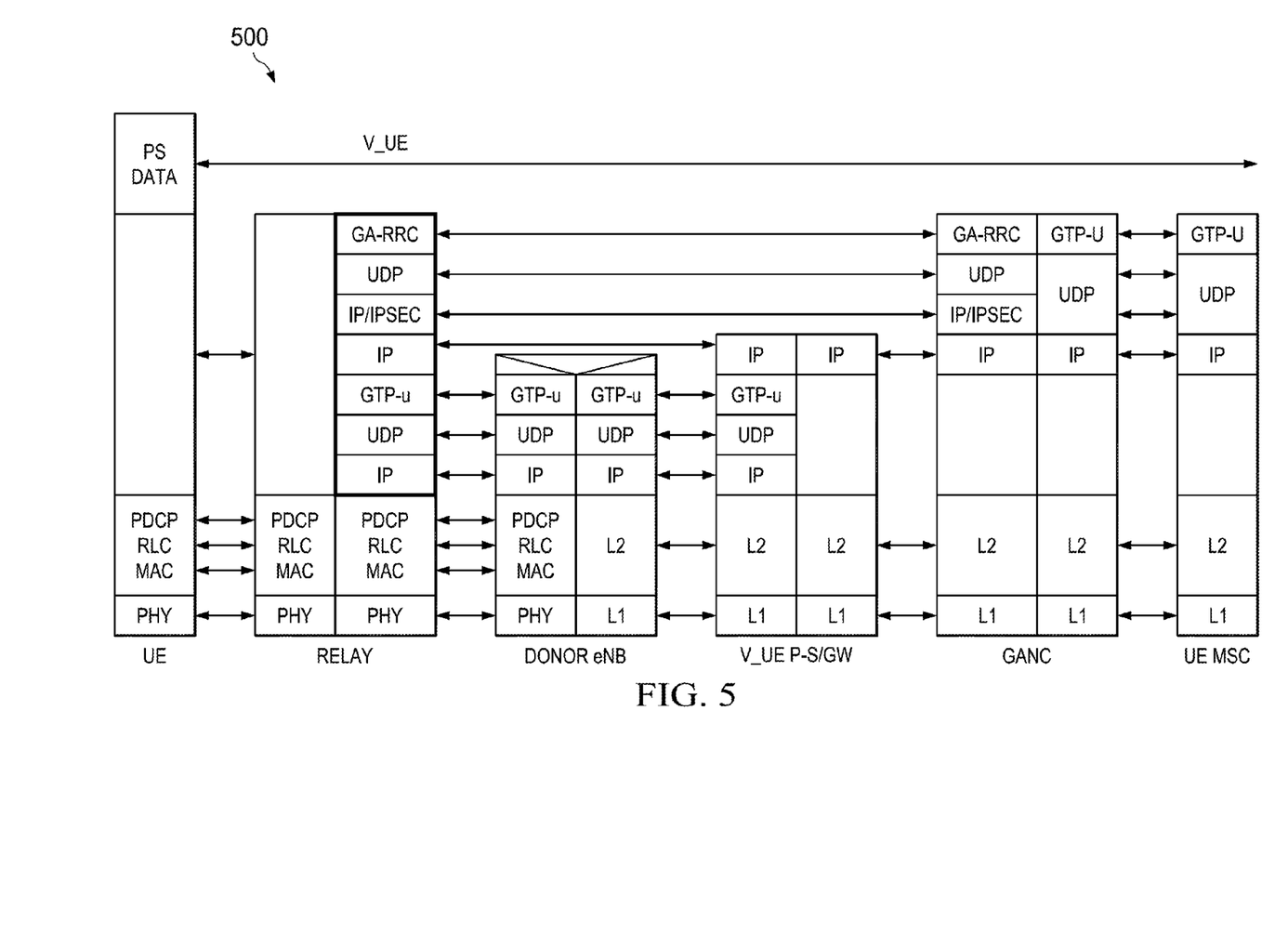
FIG. 5 illustrates an embodiment of a UTRAN PS domain user plane protocol stack for multi-RAT relay with an Iu-p core network interface.

FIG. 5 shows an embodiment of a user or data plane protocol stack 300 for multi-RAT relay for a PS domain communication. The user plane protocol stack 500 can be implemented between the different components of the architecture 100. As an example, the protocol stack 500 supports a UE access to a UE SGSN using a different RAT than the backhaul transport network, e.g., a LTE EPC. The different components (UE, RN, DeNB, V-UE CN, GANC, and UE MSC) implement the lower layers of the protocol stack 500 (e.g., L1, L2, and IP layers). However, higher layers of the user plane protocol stack 500 may be transparent to the DeNB and the V-UE PGW/SGW, and handled between the RN and the GANC. As such, the DeNB and V-UE PGW/SGW tunnel the IP packets (e.g., without further processing or encapsulation) between the multi-RAT RN and the GANC. At the user end, the multi-RAT RN handles the user plane data packets from the UE. This is accomplished by instantiating a V-UE layer at the RN (as described above). The V-UE layer interfaces using GA-RRC and other higher layer protocols (e.g., UDP, IPSEC) with the GANC to tunnel the user plane data of the UE through the DeNB and the V-UE PGW/SW. At the UE's CN end, the GANC converts and encapsulates the user plane packets from the V-UE layer into the proper data protocol layers supported by the RAT of the corresponding CN, for example into GPRS or UTRAN supported data protocol layers (e.g., GTP-U, UDP). The tunneling applies in both directions between the UE and its CN. PS data may be tunneled by the V-UE (or RN) and the GANC between the real UE and the corresponding CN.

Figure 6:
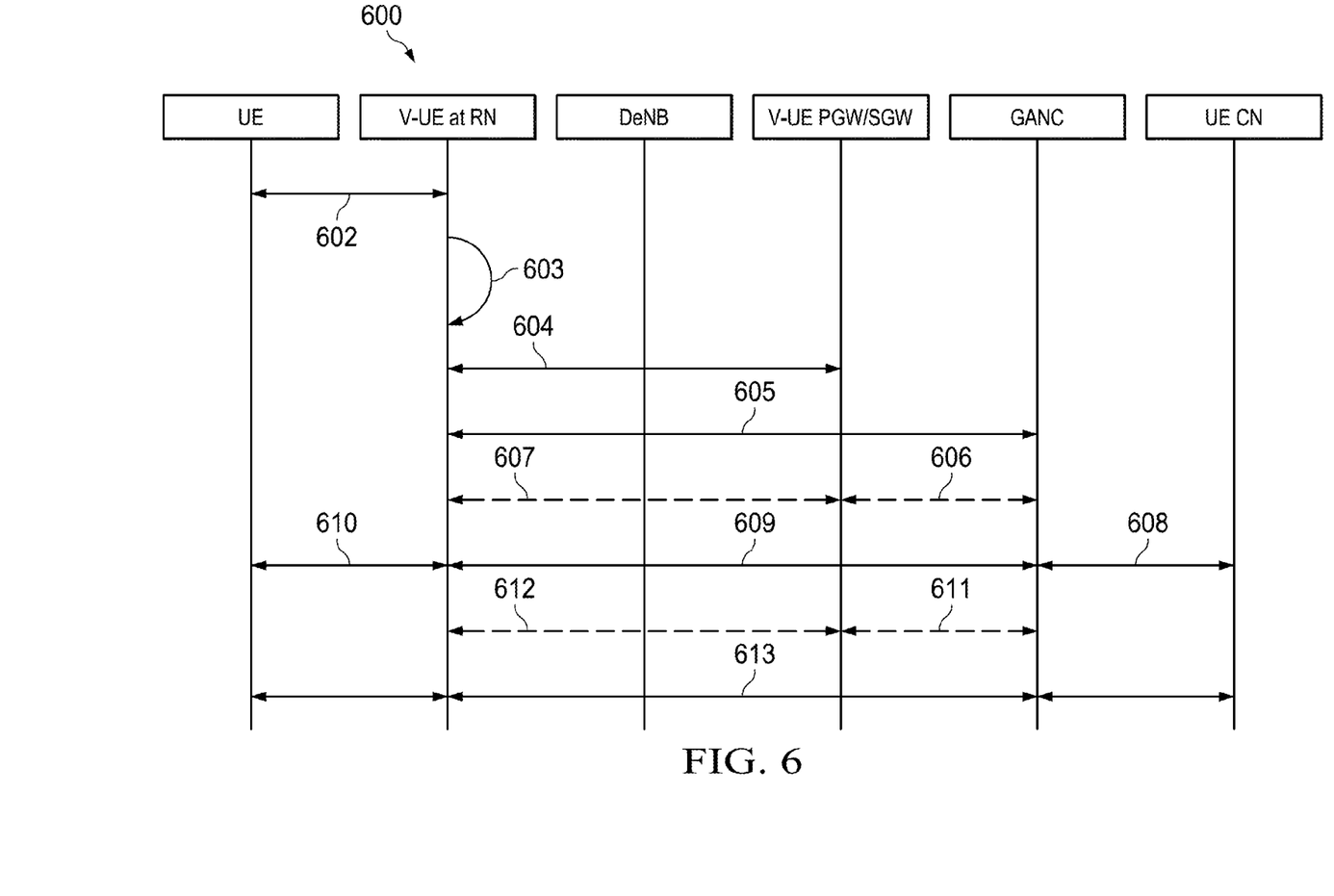
FIG. 6 illustrates an embodiment of a protocol flow for multi-RAT relay with unified backhaul transport.

FIG. 6 shows an embodiment of a protocol flow or method 600 for multi-RAT relay with unified backhaul transport. The method 600 may be implemented in the multi-RAT relay architecture 100. At step 602, the UE establishes a radio connection with the multi-RAT RN, and sends a service request to the multi-RAT RN (e.g. request for voice service). The connection is established using a link between the UE and the RN according to the RAT of the UE, for example, an E-UTRAN or UTRA Uu link, or a GSM Um link. At step 603, the RN determines that the UE's RAT is different from the RAT of the backhaul transport network, which may be LTE or LTE advanced for example. Thus, the RN instantiates a V-UE layer on behalf of the real UE. At step 604, the V-UE layer attaches to the V-UE CN, and establishes a default bearer to the V-UE PGW/SGW, via the pre-existing radio interface between the RN and the DeNB (e.g., a LTE Un link). As such, the V-UE layer accesses the V-UE PGW/SGW to send data via the DeNB, e.g., IP packets, that appears as standard data supported by the backhaul transport network. Specifically, RAT specific formats of the forwarded data are transparent to the backhaul transport network (as described above). At step 605, the default bearer established with the V-UE PGW/SGW is utilized to establish a RAT specific connection to the GANC, and transfers the RAT specific service request information received from the UE in step 602 to the GANC, using capabilities of the V-UE to GANC Up interface, e.g., GA-RRC. The V-UE PGW/SGW forwards the data packets received on the default bearer to the GANC based on the GANC destination IP address provided by the V-UE. The IP address of the V-UE's GANC may be preconfigured at the RN, or the V-UE may utilize a standardized protocol to obtain the IP address of a suitable GANC (e.g., Domain Name System (DNS) service). Depending on the type of service requested by the UE, the GANC may request from the V-UE PGW/SGW at step 606, to establish a new bearer to the V-UE at step 607, with specific QoS capabilities needed to support further service specific signaling. At step 608 the GANC forwards the service request to the UE's CN (e.g., MSC) using RAT specific RAN to CN signaling. At step 609 the GANC exchanges signaling to the V-UE to complete the service establishment and configure radio resource for the specific RAT on the RN, to support the service requested by the UE. This signaling is exchanged between GANC and V-UE, over the new bearer established in step 607, or over the default bearer established in step 604, using the GANC to V-UE Up interface, e.g. GA-RRC. At step 610 the RN exchanges signaling with the UE to assign radio resources for the requested service, and complete the service setup at the UE. This signaling uses the RAT specific protocol for radio resource control, e.g., RRC. Depending on the type of service established to the UE, and the QoS requirements of this service (e.g. a specific data rate of the vocoder selected for the voice service), the GANC may request from the V-UE PGW/SGW at step 611, to establish a new bearer to the V-UE at step 612, with specific QoS capabilities needed to support user plane QoS of the established service. At step 613 user plane data of the established service (e.g. encoded audio) flows between the UE CN, GANC, V-UE and real UE. The user plane data is exchanged between GANC and V-UE, over the new bearer established in step 612, or over the default bearer established in step 604 using the GANC to V-UE Up interface.

During each of the exchanges 604, 605, 607, 609, 612, and 613, the DeNB forwards the data, e.g., without processing, to the V-UE PGW/SGW, which behaves as a CN to the V-UE with the same RAT as the backhaul transport network. During each of the exchanges 605, 609, and 613, the V-UE PGW/SGW forwards the data or signaling to the GANC, e.g., without processing. During the exchanges 609/613, the V-UE layer and the GANC exchange respectively signaling/data between the UE and the corresponding CN, and perform necessary encapsulation or protocol mapping to tunnel the data through the backhaul transport network, as described above.

Figure 7:
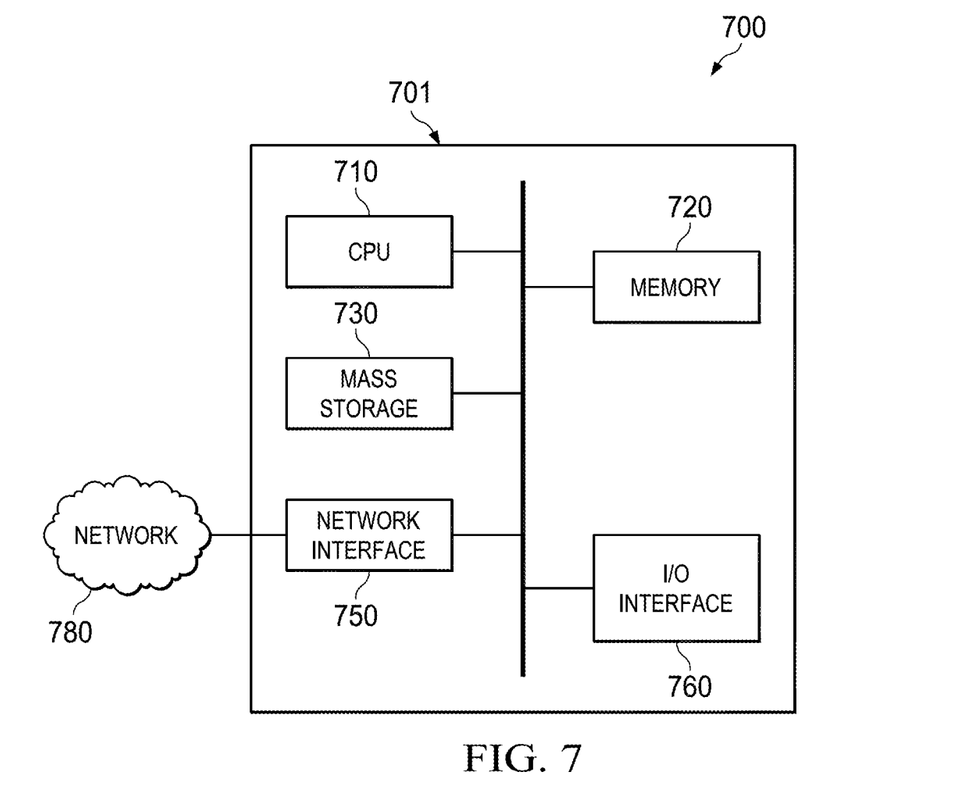
FIG. 7 is a diagram of a processing system that can be used to implement various embodiments.

FIG. 7 is a block diagram of an exemplary processing system 700 that can be used to implement various embodiments. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 700 may comprise a processing unit 701 equipped with one or more input/output devices, such as a network interfaces, storage interfaces, and the like. The processing unit 701 may include a central processing unit (CPU) 710, a memory 720, a mass storage device 730, and an I/O interface 760 connected to a bus. The bus may be one or more of any type of several bus architectures including a memory bus or memory controller, a peripheral bus or the like.

The CPU 710 may comprise any type of electronic data processor. The memory 720 may comprise any type of system memory such as static random access memory (SRAM), dynamic random access memory (DRAM), synchronous DRAM (SDRAM), read-only memory (ROM), a combination thereof, or the like. In an embodiment, the memory 720 may include ROM for use at boot-up, and DRAM for program and data storage for use while executing programs. In embodiments, the memory 720 is non-transitory. The mass storage device 730 may comprise any type of storage device configured to store data, programs, and other information and to make the data, programs, and other information accessible via the bus. The mass storage device 730 may comprise, for example, one or more of a solid state drive, hard disk drive, a magnetic disk drive, an optical disk drive, or the like.

The processing unit 701 also includes one or more network interfaces 750, which may comprise wired links, such as an Ethernet cable or the like, and/or wireless links to access nodes or one or more networks 780. The network interface 750 allows the processing unit 701 to communicate with remote units via the networks 780. For example, the network interface 750 may provide wireless communication via one or more transmitters/transmit antennas and one or more receivers/receive antennas. In an embodiment, the processing unit 701 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for supporting multiple Radio Access Technologies (RATs) using a common backhaul transport network, the method comprising:
   detecting, at a relay node, an access request from a user equipment (UE), the UE using a first RAT to wirelessly communicate with the relay node, the backhaul transport network using a second RAT to communicate with the relay node, the second RAT different from the first RAT, the access request comprising a request for a service, the service having quality of service (QoS) requirements;
   upon determining that the first RAT used by the UE is different from the second RAT used by the backhaul transport network, instantiating, at the relay node, a virtual-UE (V-UE) layer for the UE, wherein instantiating comprises creating, by the relay node, the V-UE layer on behalf of the UE, the instantiated V-UE layer supporting the first RAT used by the UE, the instantiated V-UE layer attaching and connecting to the backhaul transport network using the second RAT such that the first RAT used by the UE is transparent to the backhaul transport network;
   establishing a connection between the V-UE layer at the relay node and a V-UE gateway in the backhaul transport network, wherein establishing the connection comprises establishing a default bearer from the V-UE layer at the relay node to the V-UE gateway with a pre-existing radio interface between the relay node and a base station of the backhaul transport network;
   establishing, at the relay node, a new bearer from the V-UE layer to the backhaul transport network, the new bearer established with QoS capabilities needed to support user plane QoS requirements of the service requested by the UE, wherein establishing the new bearer comprises using the pre-existing radio interface to forward the QoS requirements of the service to the V-UE gateway in the backhaul transport network; and
   relaying, at the relay node, user plane data from a core network (CN) for the UE to the UE, wherein the relaying comprises:
      receiving, from the base station, the user plane data over the new bearer in a format of the second RAT supported by the backhaul transport network;
      translating, by the V-UE layer, the user plane data from the format of the second RAT into a format of the first RAT; and
      sending the user plane data in the format of the first RAT to the UE.

2. The method of claim 1, wherein establishing the connection further comprises:
   establishing a connection to a Generic Access Network Controller (GANC) using the default bearer to the V-UE gateway;
   transferring information about the request for the service to the GANC; and
   exchanging signaling with the GANC to establish the service over the new bearer and configure radio resources for the first RAT on the relay node.

3. The method of claim 1 further comprising exchanging signaling for a service on the new bearer from the relay node to the V-UE gateway, wherein the new bearer is established by a Generic Access Network Controller (GANC) to meet the quality of service requirements necessary to support signaling for the service.

4. The method of claim 1 further comprising exchanging user plane data for the service on the new bearer from the relay node to the V-UE gateway, wherein the new bearer is established by a Generic Access Network Controller (GANC) to meet quality of service requirements necessary to support the user plane data for the service.

5. The method of claim 1 further comprising:
   receiving data from the UE, the data having the first RAT format supported by the UE;

translating the data into the second RAT format supported by the backhaul transport network; and sending the translated data on the connection via the base station, wherein the first RAT format supported by the UE is transparent to the base station.

6. The method of claim 5, wherein translating the data into the second RAT format supported by the backhaul transport network comprises encapsulating data packets into new data packets of the second RAT format supported by the backhaul transport network.

7. The method of claim 1, wherein translating the user plane data into the first RAT format supported by the UE comprises decapsulating data packets into new data packets of the first RAT format supported by the UE.

8. The method of claim 1 further comprising:
detecting, from a second UE, an access request using the second RAT supported by the backhaul transport network; and
upon determining that the second UE supports the second RAT, forwarding data from the second UE on the pre-existing radio interface to the base station.

9. A relay node configured for supporting multiple Radio Access Technologies (RATs) using a common backhaul transport network, the relay node comprising:
at least one processor; and
a non-transitory computer readable storage medium storing programming for execution by the at least one processor, the programming including instructions to:
detect an access request from a user equipment (UE), the UE using a first RAT to wirelessly communicate with the relay node, the backhaul transport network using a second RAT to communicate with the relay node, the second RAT different from the first RAT, the access request comprising a request for a service, the service having quality of service (QoS) requirements;
upon determining that the first RAT used by the UE is different from the second RAT used by the backhaul transport network, instantiate a virtual-UE (V-UE) layer for the UE, wherein instantiating comprises creating the V-UE layer on behalf of the UE, the instantiated V-UE layer supporting the first RAT used by the UE, the instantiated V-UE layer attaching and connecting to the backhaul transport network using the second RAT such that the first RAT used by the UE is transparent to the backhaul transport network; and
establish a connection between the V-UE layer at the relay node and a V-UE gateway in the backhaul transport network, wherein establishing the connection comprises establishing a default bearer from the V-UE layer at the relay node to the V-UE gateway with a pre-existing radio interface between the relay node and a base station of the backhaul transport network;
establish a new bearer from the V-UE layer to the backhaul transport network, the new bearer established with QoS capabilities needed to support user plane QoS requirements of the service requested by the UE, wherein establishing the new bearer comprises using the pre-existing radio interface to forward the QoS requirements of the service to the V-UE gateway in the backhaul transport network; and
relay user plane data from a core network (CN) for the UE to the UE, wherein the instruction to relay comprises instructions to:
receive, from the base station, the user plane data over the new bearer in a format of the second RAT supported by the backhaul transport network;
translate, by the V-UE layer, the user plane data from the format of the second RAT into a format of the first RAT; and
send the user plane data in the format of the first RAT to the UE.

10. The relay node of claim 9, wherein the programming includes further instructions to:
establish a connection to a Generic Access Network Controller (GANC) using the default bearer to the V-UE gateway;
transfer information about the request for the service to the GANC; and
exchange signaling with the GANC to establish the service over the new bearer and configure radio resources for the first RAT on the relay node.

11. The relay node of claim 9, wherein the backhaul transport network is coupled to a core network (CN) that supports the first RAT used by the UE, and wherein the base station and the backhaul transport network are configured to forward data for the UE between the relay node and the CN as Internet Protocol (IP) packets or packets supported by the second RAT used by the backhaul transport network.

12. The relay node of claim 9, wherein the second RAT used by the backhaul transport network is a Long Term Evolution (LTE) RAT, and wherein the pre-existing radio interface between the relay node and the base station is a LTE Un link.

13. The relay node of claim 9, wherein the relay node is a mobile relay node, and wherein the base station is a target base station in a handover process of the relay node.

14. A method for supporting multiple Radio Access Technologies (RATs) using a common backhaul transport network, the method comprising:
establishing, at a gateway, a connection with a virtual-user equipment (V-UE) layer at a relay node, wherein establishing the connection comprises establishing a default bearer to the V-UE layer at the relay node, the connection established with a pre-existing radio interface between the relay node and a base station of the backhaul transport network,
wherein the V-UE layer at the relay node is instantiated to serve an access request to the relay node from a user equipment (UE) using a first RAT to wirelessly communicate with the relay node, the access request comprising a request for a service, the service having quality of service (QoS) requirements, wherein the backhaul transport network uses a second RAT to communicate with the relay node, the second RAT different from the first RAT, wherein the V-UE is instantiated on behalf of the UE, the V-UE layer instantiated to support the first RAT used by the UE, the V-UE layer attaching and connecting to the backhaul transport network using the second RAT such that the first RAT used by the UE is transparent to the backhaul transport network;
establishing, by the gateway, a new bearer from the V-UE layer to the backhaul transport network, the new bearer established with QoS capabilities needed to support user plane QoS requirements of the service requested by the UE, wherein establishing the new bearer comprises receiving the QoS requirements of the service via the default bearer to the V-UE layer;
receiving, by the gateway, user plane data for the UE from a core network (CN) for the UE, the user plane data in a format of the first RAT supported by the UE; and
sending, by the gateway, the user plane data for the UE to the V-UE layer at the relay node, the user plane data translated by the gateway to a format of the second RAT supported by the backhaul transport network.

15. The method of claim 14 further comprising transporting signaling for the service on the new bearer from the gateway to the relay node, wherein the new bearer is established by a Generic Access Network Controller (GANC) to meet the quality of service requirements necessary to support signaling for the service.

16. The method of claim 14 further comprising transporting the user plane data for the service on the new bearer from the gateway to the relay node, wherein the new bearer is established by a Generic Access Network Controller (GANC) to meet the quality of service requirements necessary to support the user plane data for the service.

17. The method of claim 14 further comprising forwarding signaling on the new bearer between the gateway and the V-UE layer at the relay node using the second RAT supported by the backhaul transport network, wherein the first RAT supported by the UE is transparent to the gateway.

18. A network gateway configured for supporting multiple Radio Access Technologies (RATs) using a common backhaul transport network, the gateway comprising:
at least one processor; and
a non-transitory computer readable storage medium storing programming for execution by the at least one processor, the programming including instructions to:
establish a connection with a virtual-user equipment (V-UE) layer at a relay node, wherein establishing the connection comprises establishing a default bearer to the V-UE layer at the relay node, the connection established with a pre-existing radio interface between the relay node and a base station of the backhaul transport network,
wherein the V-UE layer at the relay node is instantiated to serve an access request to the relay node from a user equipment (UE) using a first RAT to wirelessly communicate with the relay node, the access request comprising a request for a service, the service having quality of service (QoS) requirements, wherein the backhaul transport network uses a second RAT to communicate with the relay node, the second RAT different from the first RAT, wherein the V-UE is instantiated on behalf of the UE, the V-UE layer instantiated to support the first RAT used by the UE, the V-UE layer attaching and connecting to the backhaul transport network using the second RAT such that the first RAT used by the UE is transparent to the backhaul transport network;
establish a new bearer from the V-UE layer to the backhaul transport network, the new bearer established with QoS capabilities needed to support user plane QoS requirements of the service requested by the UE, wherein establishing the new bearer comprises receiving the QoS requirements of the service via the default bearer to the V-UE layer;
receive user plane data for the UE from a core network (CN) for the UE, the user plane data in a format of the first RAT supported by the UE; and
send, by the gateway, the user plane data for the UE to the V-UE layer at the relay node, the user plane data translated by the gateway to a format of the second RAT supported by the backhaul transport network.

19. The network gateway of claim 18, wherein the programming includes further instructions to:
receive from a Generic Access Network Controller (GANC) the request to the service for the UE; and
establish the new bearer to the relay node to support signaling for the service.

20. The network gateway of claim 18, wherein the programming includes further instructions to:
receive from a Generic Access Network Controller (GANC) the request to the service for the UE; and
establish the new bearer to the relay node to support user plane data for the service.

21. The network gateway of claim 18, wherein the network gateway comprises a Generic Access Network Controller (GANC).

22. A method for supporting multiple Radio Access Technologies (RATs) using a common backhaul transport network, the method comprising:
establishing, at a Generic Access Network Controller (GANC), a connection to a virtual-user equipment (V-UE) layer at a relay node via a default bearer between the relay node and a V-UE gateway, wherein the V-UE layer is instantiated at the relay node on behalf of a UE supporting a first RAT in response to receiving an access request from the UE, the access request comprising a request for a service, the service having quality of service (QoS) requirements, wherein the default bearer is established via a pre-existing radio interface between the relay node and a base station of the backhaul transport network, wherein the backhaul transport network uses a second RAT to communicate with the relay node, the second RAT different from the first RAT, wherein the instantiated V-UE layer attaches and connects to the backhaul transport network using the second RAT such that the first RAT used by the UE is transparent to the backhaul transport network;
receiving, from the relay node, the request to the service for the UE;
establishing, at the GANC, a new bearer from the V-UE layer at the relay node to the GANC, the new bearer established with QoS capabilities needed to support user plane QoS requirements of the service requested by the UE, wherein establishing the new bearer comprises receiving the QoS requirements of the service using the pre-existing radio interface;
exchanging signaling with the relay node to establish the service and configure radio resource on the relay node;
receiving, by the GANC, user plane data for the UE from a core network (CN) for the UE, the user plane data in a format of the first RAT supported by the UE; and
sending, by the GANC, user plane data for the UE to the V-UE layer at the relay node, the user plane data transmitted through the backhaul transport network in a format of the second RAT supported by the backhaul transport network.

23. The method of claim 22, wherein the new bearer is established to meet quality of service requirements necessary to support the signaling for the service.

24. The method of claim 22, wherein the new bearer is established to meet quality of service requirements necessary to support the user plane data for the service.

25. The method of claim 22 further comprising:
receiving, from the relay node, data for the UE, where in the data is translated by the relay node into the second RAT format supported by the backhaul transport network;
translating back the data into the first RAT format supported by the CN for the UE; and
sending the translated data to the CN.

26. The method of claim 25, wherein translating the data into the first RAT format supported by the CN comprises decapsulating data packets into new data packets of the first RAT format supported by the core network.

27. The method of claim 22 further comprising:
receiving, from the CN for the UE, data intended for the UE and having the first RAT format supported by the CN and the UE;
translating the data into the second RAT format supported by the backhaul transport network; and
sending the translated data to the relay node via the base station.

28. The method of claim 27, wherein translating the data into the second RAT format supported by the backhaul transport network comprises encapsulating data packets into new data packets of the second RAT format supported by the backhaul transport network.

29. A network component configured for supporting for providing multiple Radio Access Technologies (RATs) using a common backhaul transport network, the network component comprising:
at least one processor; and
a non-transitory computer readable storage medium storing programming for execution by the at least one processor, the programming including instructions to:
establish a connection to a virtual-user equipment (V-UE) layer at a relay node via a default bearer between the relay node and a V-UE gateway, wherein the V-UE layer is instantiated at the relay node on behalf of a UE supporting a first RAT in response to receiving an access request from the UE, the access request comprising a request for a service, the service having quality of service (QoS) requirements, wherein the default bearer is established via a pre-existing radio interface between the relay node and a base station of the backhaul transport network, wherein the backhaul transport network uses a second RAT to communicate with the relay node, the second RAT different from the first RAT, wherein the instantiated V-UE layer attaches and connects to the backhaul transport network using the second RAT such that the first RAT used by the UE is transparent to the backhaul transport network;
receive, from the relay node, the request to the service for the UE;
establish a new bearer to the V-UE layer at the relay node, the new bearer established with QoS capabilities needed to support user plane QoS requirements of the service requested by the UE, wherein establishing the new bearer comprises receiving the QoS requirements of the service using the pre-existing radio interface;
exchange signaling with the relay node to establish the service and configure radio resource on the relay node;
receive user plane data for the UE from a core network (CN) for the UE, the user plane data in a format of the first RAT supported by the UE; and
send user plane data for the UE to the V-UE layer at the relay node, the user plane data transmitted through the backhaul transport network in a format of the second RAT supported by the backhaul transport network.

30. The network component of claim 29, wherein the new bearer is established to meet the quality of service requirements necessary to support signaling for the service.

31. The network component of claim 29, wherein the new bearer is established to meet the quality of service requirements necessary to support the user plane data for the service.

32. The network component of claim 29, wherein the programming includes further instructions to:
receive, from the relay node, data for the UE, where in the data is translated by the relay node into the second RAT format supported by the backhaul transport network;
translate back the data into the first RAT format supported by the CN for the UE; and
send the translated data to the CN.

33. The network component of claim 29, wherein the programming includes further instructions to:
receive, from the CN for the UE, data intended for the UE and having the first RAT format supported by the CN and the UE;
translate the data into the second RAT format supported by the backhaul transport network; and
send the translated data to the relay node via the base station.

34. The network component of claim 29, wherein the network component comprises the V-UE gateway.

35. The network component of claim 29, wherein the network component supports a function of a radio access network controller (RNC) or base station network controller (BSC).

* * * * *